United States Patent [19]

Olinger et al.

[11] Patent Number: 4,526,597
[45] Date of Patent: Jul. 2, 1985

[54] GAS INJECTION IN FIBER FORMING

[75] Inventors: John L. Olinger, Newark; Seshadri Srinivasan, Pickerington, both of Ohio

[73] Assignee: Owens-Corning Fiberglas Corporation, Toledo, Ohio

[21] Appl. No.: 643,564

[22] Filed: Aug. 23, 1984

[51] Int. Cl.³ .................... C03B 37/085; C03B 37/04
[52] U.S. Cl. ................................ 65/1; 65/2;
65/8; 65/15; 264/176 F; 264/176 C
[58] Field of Search .............................. 65/1, 2, 8, 15;
264/176 F, 176 C

[56] References Cited

U.S. PATENT DOCUMENTS

| | | |
|---|---|---|
| 1,750,971 | 3/1930 | Soubier . |
| 2,251,727 | 8/1941 | Wallech et al. . |
| 2,457,785 | 12/1948 | Slayter et al. . |
| 2,765,586 | 10/1956 | Wilson . |
| 2,880,551 | 4/1959 | Martuscello et al. . |
| 3,282,667 | 11/1966 | Stalego et al. . |
| 3,372,014 | 3/1968 | Garrison ............................ 65/8 X |
| 3,421,873 | 1/1969 | Burgman et al. ...................... 65/1 |
| 3,692,507 | 9/1972 | Gladney et al. . |
| 3,736,116 | 5/1973 | Russell .............................. 65/12 X |
| 3,846,097 | 11/1974 | Russell .............................. 65/12 X |
| 4,078,909 | 3/1978 | Dietzsch et al. . |
| 4,361,624 | 11/1982 | Spivack . |

Primary Examiner—Robert Lindsay
Attorney, Agent, or Firm—Ronald C. Hudgens; Kenneth H. Wetmore; Ted C. Gillespie

[57] ABSTRACT

A method and apparatus for forming fibers includes a spinner having a porous member positioned therein in a region normally covered by molten glass, and means for supplying a gas to the porous member under pressure sufficient to cause introduction of the gas into the molten mineral material.

20 Claims, 6 Drawing Figures

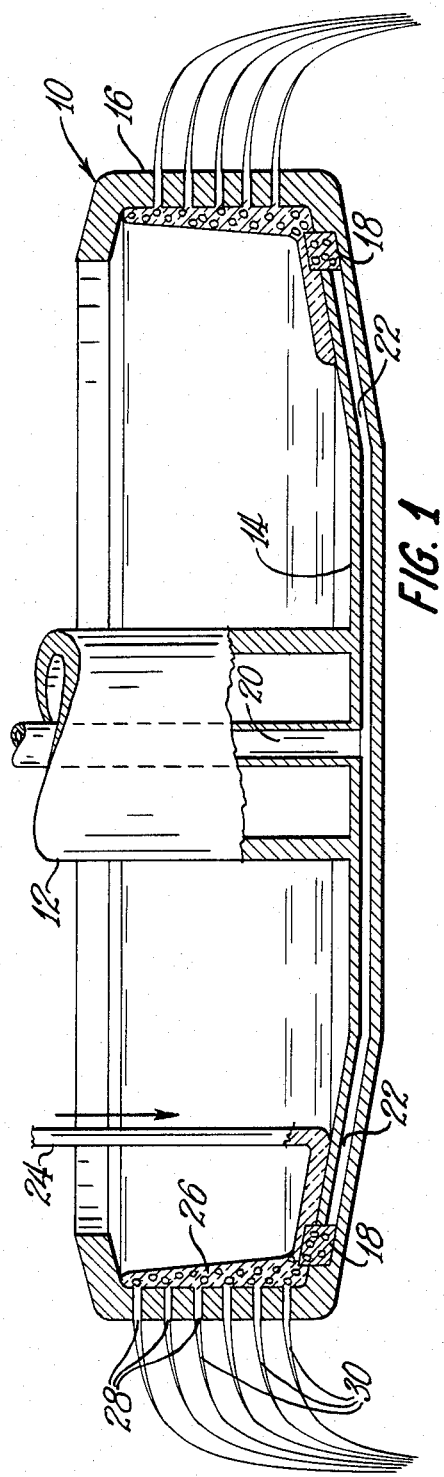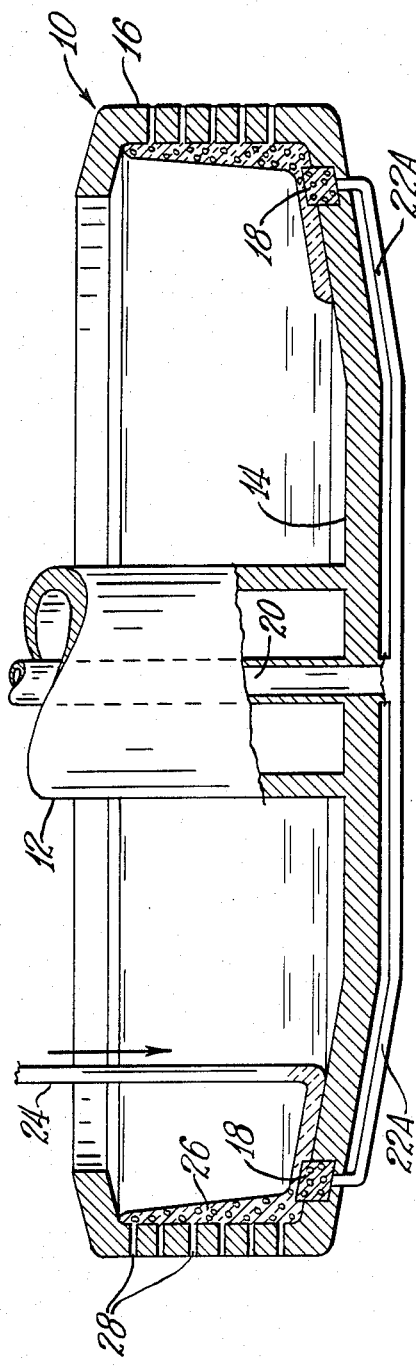

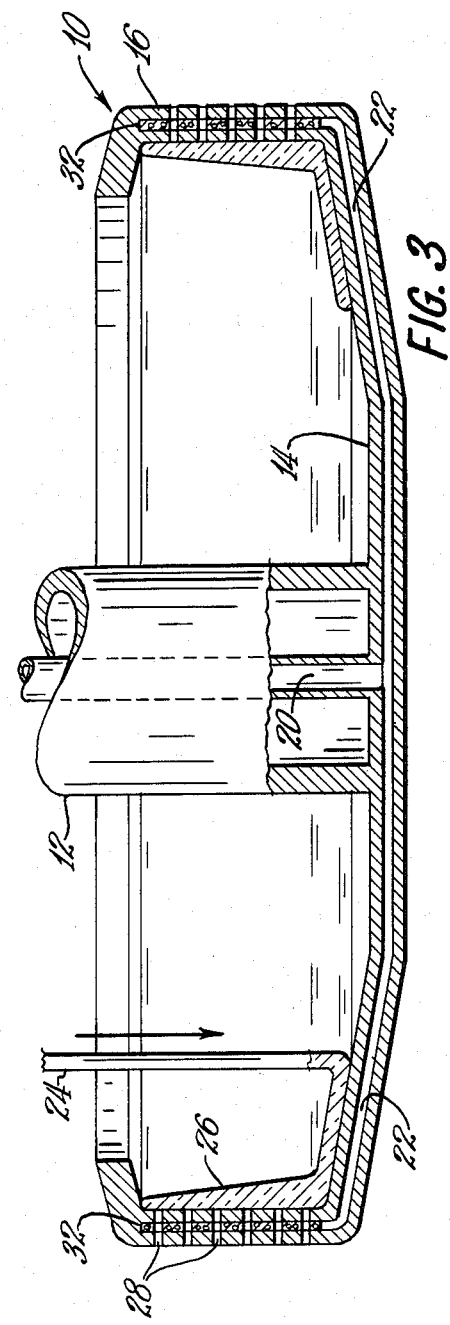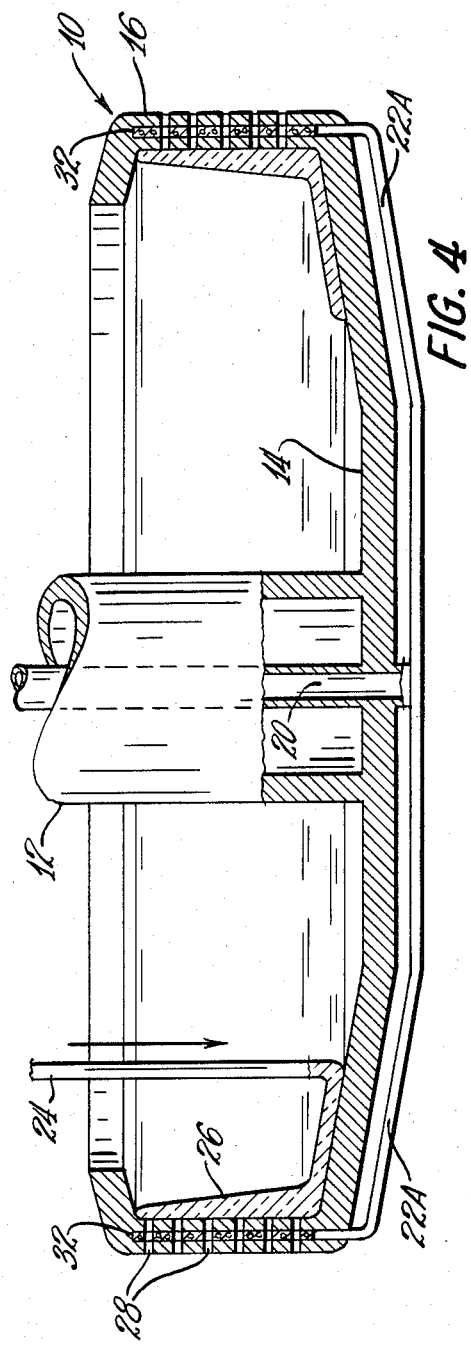

GAS INJECTION IN FIBER FORMING

TECHNICAL FIELD

This invention pertains to the manufacture of fibers from molten material, such as forming glass fibers from molten glass for insulation products. In one of its more specific aspects, this invention relates to the introduction of materials into molten mineral material immediately prior to the centrifugation of molten mineral material into fibers.

BACKGROUND OF THE INVENTION

A common practice in forming fibers of mineral material such as glass fibers, is to discharge the molten glass into a rotating centrifuge or spinner. A spinner typically has an orificed peripheral wall, and molten glass flows radially outwardly on the spinner bottom wall, upward along the spinner peripheral wall, and finally passes through the orifices to produce glass fibers. Typically, the spinner peripheral wall is adapted with 12,000 or more orifices, having a diameter within the range of from about 20 to about 40 thousandths inches. The streams of glass emanating from the spinner are rapidly cooled from an initial temperature on the order of about 1800° F. to room temperature.

One of the problems associated with centrifuging fibers is that of controlling the characteristics, both chemical and physical, of the material immediately prior to fiberization. It would be desirable, for example, if one were able to modify the viscosity or chemical composition of the material immediately prior to fiberization. The last minute addition of certain chemicals to the material could help avoid pollution problems. The last minute addition could also be used to control the composition and characteristics of the material where the introduction of a substance into molten material generates a fast-paced chemical or physical reaction. It is desirable to control composition and characteristics not only of mineral fibers, but also of ceramic, polymeric and other organic fibers.

Another long sought objective of fiber forming processes is the ability to control the environment of the stream of molten material issuing from the orifices of the spinner or bushing. Molten streams of glass, for example, are subject to significant attenuation forces in an environment of turbulent gases of varying temperature and chemical composition prior to the solidification of the streams into solid fibers. It would be desirable to have better control of the environment experienced by the molten streams as they issue from the centrifuge or bushing.

Another desirable attribute of fiber forming processes is the ability to manufacture hollow or partially hollow fibers. Such fibers would enable weight reduction and improve the thermal resistance of insulation products.

STATEMENT OF THE INVENTION

There has now been developed a method and apparatus for solving the above problems of the prior art by contacting the molten material, such as glass, in the spinner with a porous material which has been pressurized by a gas. As the molten glass passes across the porous material, the gas forms gas bubbles in the glass. If the bubbles are smaller than the diameter of the orifices, hollow fibers can be produced. Also, the introduction of a gas into contact with the glass in a spinner enables a last minute addition or change to the chemical composition or physical characteristics of the glass immediately prior to centrifugation of the glass. The invention can also be used in a staple process or in a conventional continuous textile process. The invention is suitable for use with any number of heat-softenable materials such as organic polymeric material for making organic fibers, or mineral material for making mineral fibers.

According to this invention, there is provided apparatus for forming fibers from molten material comprising a spinner having a bottom wall and an orificed peripheral wall, the spinner being adapted to receive molten material for centrifuging fibers, a porous member positioned within the spinner in a region normally covered by molten material, and means for supplying a gas to said porous member under pressure sufficient to cause introduction of the gas into the molten material. The pressure of the gas will depend on such factors as the head pressure of the glass within the spinner or bushing, the viscosity of the glass, and the solubility of the gas in the glass. This apparatus can be used to continuously provide bubbles to the molten material in order to make hollow fibers. Also, this apparatus can be employed to provide changes in the chemical and physical characteristics of the material.

In a specific embodiment of the invention, the porous member comprises a porous metallic material. The porous metallic material can be a perforated metal plate. Alternatively, the porous metallic material can be formed from powdered metallurgy, or any other type of porous metallic material.

In another specific embodiment of the invention, the porous member comprises a ceramic material.

In yet another specific embodiment of the invention, the porous member comprises a substantially annular member positioned on the spinner bottom wall.

In another specific embodiment of the invention, the porous member comprises a porous layer positioned within the spinner peripheral wall. The spinner peripheral wall can have a laminar construction, with the porous layer as the core material. The orifices through which the glass streams emanate pass through the laminar construction. The molten glass comes into contact with the porous layer as the glass flows though the orifices. In this manner the environment surrounding the streams of molten material can be controlled.

According to this invention, there is also provided apparatus for forming fibers from molten material comprising a container for holding a body of molten material, the container having an orificed wall from which streams of molten material emanate to form fibers, a porous member positioned within the orificed wall, and means for supplying a gas to the porous member. The container can comprise a bushing for holding molten mineral material.

According to this invention, there is also provided a method for forming fibers from molten material comprising supplying molten material to the rotating spinner, contacting the molten material with a porous member within the spinner, supplying a gas to the porous member under pressure sufficient to cause introduction of the gas into the molten material, and centrifuging the gassified molten material into fibers.

In a specific embodiment of the invention, the centrifuging of the gassified molten mineral material produces hollow fibers.

In a preferred embodiment of the invention, the gas forms bubbles in the molten mineral material.

In a more preferred embodiment of the invention, the bubbles are smaller than the orifices in the spinner peripheral wall.

In a specific embodiment of the invention, the gas is a low conductivity gas.

In another specific embodiment of the invention, the gas is an inert gas.

In yet another specific embodiment of the invention, the gas includes one or more of the group comprising hydrogen, oxygen and fluorine.

In another specific embodiment of the invention, the gas contains an element which affects the viscosity of the molten mineral material when mixed therewith.

DESCRIPTION OF THE DRAWINGS

FIG. 1 is a schematic cross-sectional view in elevation of a spinner with a porous member positioned on the spinner bottom wall according to the principles of this invention.

FIG. 2 is a schematic cross-sectional view in elevation similar to that of FIG. 1, with an alternative gas delivery system.

FIG. 3 is a schematic cross-sectional view in elevation of a spinner having a porous layer positioned within the spinner peripheral wall according to the principles of this invention.

FIG. 4 is a schematic cross-sectional view in elevation of a spinner similar to that of FIG. 3, but with an alternative gas delivery system.

DESCRIPTION OF THE INVENTION

Figure 5:
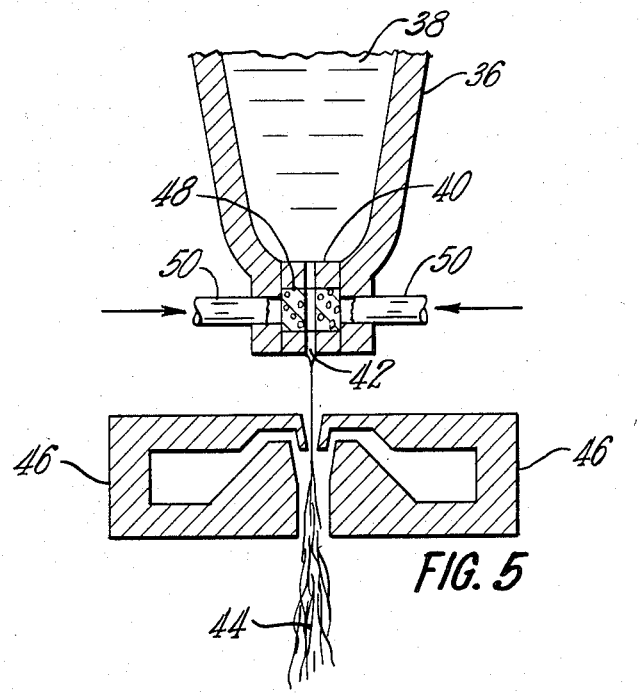
FIG. 5 is a schematic cross-sectional view in elevation of a staple bushing according to the principles of this invention.

This invention will be described in terms of glass fiber forming and attenuating process. It is to be understood that the method and apparatus are suitable for fibers of other materials, such as ceramic, polymeric and other organic materials and particularly of other mineral materials such as rock, slag and basalt.

As shown in FIG. 1, spinner 10 is mounted for rotation on quill 12, and is adapted with spinner bottom wall 14 and spinner peripheral wall 16. Positioned on the spinner at a region normally covered by molten glass, is porous member 18. The porous member can be any member suitable for withstanding the harsh molten glass environment and for supplying gas into the molten glass. In its simplest form, the porous member is the open end of a pipe through which gas is supplied. The porous member can also be a gas delivery slot or well, or any other type of termination of a gas supply conduit.

Preferably, the porous member has gas supply pores or passageways of uniform size, thereby enabling the production of uniform-sized bubbles in the glass. The porous member can be a porous metallic material, such as one formed from powdered metallurgy. The metal can be the same composition as that of the spinner, or the metal can be of a different composition. The porous member can comprise a perforated metal plate through which the gas passes. Alternatively, the porous member can be a porous ceramic material. Preferably, the porous material is one that is not wetted by molten glass, although for some applications wetting may be desirable. The wetting characteristic of the glass and the porous material will probably affect the bubble size. As shown, the porous member can be a substantially annular member positioned on the spinner bottom wall.

Means must be provided for supplying the gas to the porous member. Such means can be any means suitable for this purpose such as gas supply conduit 20 and gas branch conduits 22 positioned with the spinner bottom wall. Preferably, the gas is supplied under pressure sufficient to cause introduction of the gas into the molten mineral material. Under certain operating conditions this pressure could be extremely low. The gas supply can be controlled by any suitable means such as a valve, not shown, to effect control over the amount of gas being supplied into the molten glass on a continuous basis.

In operation, a stream of molten glass 24 is directed to impinge on the spinner bottom wall. The molten glass flows radially outwardly by centrifugal force passing over the pressurized porous member. The introduction of the bubbles into the glass forms gassified glass 26 which then flows through orifices 28 in the spinner peripheral wall to form fibers 30, which may be hollow fibers.

As shown in FIG. 2, alternate gas branch conduit 22A can be positioned beneath the spinner bottom wall, rather than within the interior of the spinner bottom wall.

As shown in FIG. 3, the porous member can be a layer, such as porous layer 32, positioned within the spinner peripheral wall. In such a construction, the molten glass would pass through the porous layer as the glass passes through the orifices in the spinner peripheral wall. This construction would enable a change or control of the forming environment immediately prior to forming fibers.

As shown in FIG. 4, the porous layer can be supplied by an alternate gas branch conduit 22A which is external of the spinner.

When using the apparatus of FIGS. 3 and 4 with the porus layer positioned to surround the orifices through which the molten material passes, the gases can be used to affect the properties of the fiber, or of the fibrous product itself. Fiber atrributes, such as strength, geometry, surface characteristics and thermal characteristics, can be affected by the chemistry of the gas surrounding the glass as the glass passes through the orifices. This controlled environment can be used to produce hollow or curly fibers.

It may be advantageous to use inert gases, such as nitrogren, carbon dioxide or argon. When the gases are to be supplied to a porous member in the spinner, low conductivity gases, such as freon, carbon dioxide, and sulfur dioxide, can be employed to reduce the thermal conductivity of the glass. When it is desired to form bubbles in the molten glass, the gas is preferably one of low solubility in the glass. The solubility may affect bubble size.

Reactive gases can also be used for introduction into the molten glass. Such gases can affect the redox state of the glass. Hydrogen, for example, is a strong reducing agent, and when ingested into a sulfate-containing glass would result in the evolution of sulfur dioxide, which would act as a blowing agent to form bubbles in the glass. Another reducing gas which could be employed is carbon monoxide. Fluorine is another reactive gas, and can be used to control or cange the temperature and/or viscosity of the glass just prior to forming fibers. Air oxygen can be employed as oxidizing gases.

As shown in FIG. 5, the apparatus for a staple process according to this invention can be comprised of a container, such as bushing 36 for containing body 38 of molten glass. Bushing bottom wall 40 contains orifices 42 for the issuance of streams of molten glass, which are attenuated into staple fibers 44 by any suitable means, such as blowers 46. Positioned within the bushing bottom wall is porous layer 48, which is adapted with inlet conduits 50 to supply gas to the glass as the glass passes through the bushing bottom wall.

Figure 6:
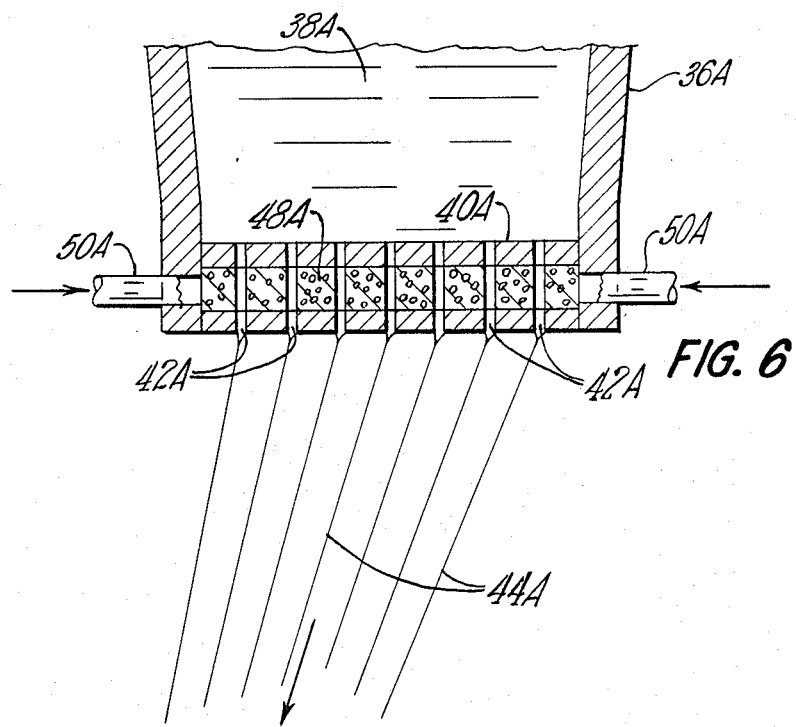
FIG. 6 is a schematic cross-sectional view in elevation of a continuous fiber forming bushing according to the principles of this invention.

As shown in FIG. 6, the invention can be employed in a conventional textile bushing 36A to produce continuous fibers 44A by mechanical attenuation. Bushing bottom wall 40A contains porous layer 48A which brings the gas into contact with the glass as the glass passes through orifices 42A.

It will be evident from the foregoing that various modifications can be made to this invention. Such, however, are considered as being within the scope of the invention.

INDUSTRIAL APPLICABILITY

This invention will be found to be useful in the production of glass fibers for such uses as thermal insulation and acoustical insulation products, and reinforcements for organic matrices.

We claim:

1. Apparatus for forming fibers from molten material comprising a spinner having a bottom wall and an orificed peripheral wall, said spinner being adapted to receive molten material for centrifuging fibers, a porous member positioned within said spinner in a region normally covered by molten material, and means for supplying a gas to said porous member under pressure sufficient to cause introduction of the gas into the molten material.

2. The apparatus of claim 1 in which said porous member comprises a porous metallic material.

3. The apparatus of claim 2 in which said porous metallic material comprises a perforated metal plate.

4. The apparatus of claim 2 in which said porous metallic material is formed from powdered metallurgy.

5. The apparatus of claim 1 in which said porous member comprises a ceramic material.

6. The apparatus of claim 1 in which said porous member comprises a substantially annular member positioned on said spinner bottom wall.

7. The apparatus of claim 1 in which said porous member comprises a porous layer positioned within said spinner peripheral wall.

8. Apparatus for forming mineral fibers comprising a container for holding a body of molten mineral material, said container having an orificed wall from which streams of molten mineral material emanate to form fibers, a porous member positioned within said container in a region normally covered by molten mineral material, and means for supplying a gas to said porous member under pressure sufficient to cause introduction of the gas into the molten mineral material.

9. A method for forming fibers from molten material comprising supplying molten material to a rotating spinner, contacting the molten material with a porous member within said spinner, supplying a gas to said porous member under pressure sufficient to cause introduction of the gas into said molten material, and centrifuging the gassified molten material into fibers.

10. The method of claim 9 comprising forming mineral fibers from molten mineral material.

11. The method of claim 10 comprising contacting said molten material with said porous member on the bottom wall of said spinner.

12. The method of claim 11 comprising contacting said molten mineral material with said porous member in the peripheral wall of said spinner.

13. The method of claim 10 in which said gas forms bubbles in said molten mineral material.

14. The method of claim 11 in which the centrifuging of the gassified molten mineral material produces hollow fibers.

15. The method of claim 13 in which said bubbles are smaller than the orifices in the spinner peripheral wall.

16. The method of claim 9 in which said gas is a low conductivity gas.

17. The method of claim 9 in which said gas is an inert gas.

18. The method of claim 9 in which said gas includes one or more of the group comprising hydrogen, carbon monoxide, air, oxygen and fluorine.

19. The method of claim 9 in which said gas contains an elment which affects the viscosity of the molten material when mixed therewith.

20. The method for forming mineral fibers comprising contacting molten mineral material with a porous member within a container for holding the molten mineral material, supplying a gas to said porous member under pressure sufficient to cause introduction of said gas into said molten mineral material, and withdrawing streams of molten mineral material through an orificed wall of said container to form mineral fibers.

* * * * *